United States Patent [19]

Trice

[11] Patent Number: 5,287,871
[45] Date of Patent: Feb. 22, 1994

[54] VEHICLE SUN SHADE

[76] Inventor: Denis V. P. Trice, 75 Portlock Road, Maidenhead, Berkshire SL6 6DX, United Kingdom

[21] Appl. No.: 852,165
[22] PCT Filed: Aug. 23, 1990
[86] PCT No.: PCT/GB90/01312
  § 371 Date: Apr. 3, 1992
  § 102(e) Date: Apr. 3, 1992
[87] PCT Pub. No.: WO91/03384
  PCT Pub. Date: Mar. 21, 1991

[30] Foreign Application Priority Data

Sep. 1, 1989 [GB] United Kingdom ............... 8919839

[51] Int. Cl.$^5$ .............................................. E04H 15/06
[52] U.S. Cl. ................................. 135/88; 135/16; 135/21; 248/214; 248/229; 248/535
[58] Field of Search .................. 135/21, 27, 44, 117, 135/16, 88, 89, 90; 248/208, 312.1, 514, 535, 214, 534, 229

[56] References Cited

U.S. PATENT DOCUMENTS 1,162,608 11/1915 Baldwin ........................ 248/514
3,383,196 9/1974 Protzman ...................... 248/310
4,733,681 3/1988 Lee .................................. 135/16

Primary Examiner—Carl D. Friedman
Assistant Examiner—Lan C. Mai
Attorney, Agent, or Firm—Edwin D. Schindler

[57] ABSTRACT

A vehicle sun shade comprises a mounting bracket 10 for fitting to the top edge of an opened window of the vehicle, and a shade for mounting to the bracket 10. The shade 20 comprises a stem 22 and a foldable canopy 23, the bracket 10 having a clamp to mount the shade 20 securely in place.

2 Claims, 5 Drawing Sheets

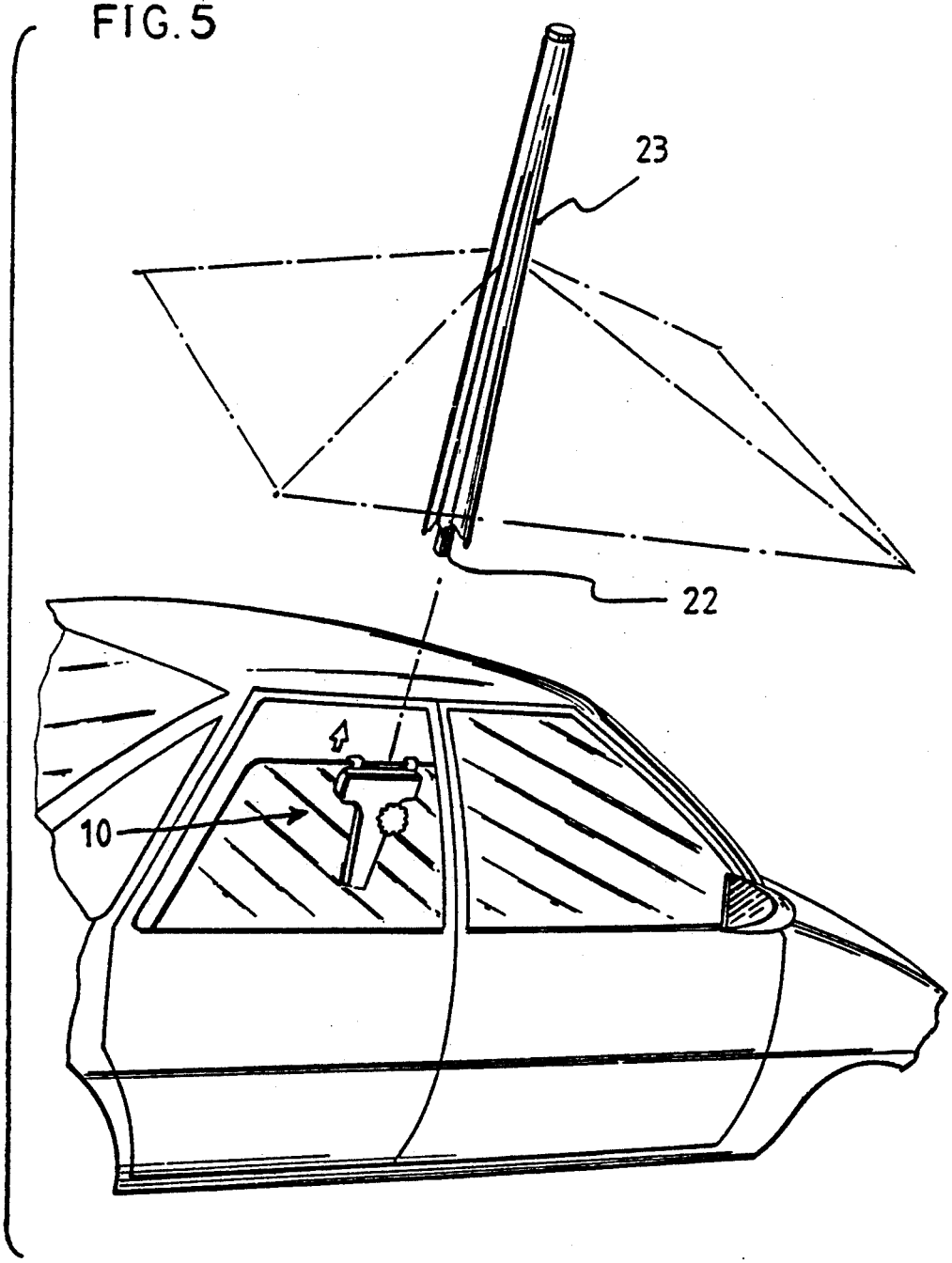

VEHICLE SUN SHADE

This invention relates to a sun shade for mounting to a parked vehicle to provide shade from the sun.

In accordance with this invention, there is provided a vehicle sun shade comprising a mounting bracket for fitting to the top edge of a window of the vehicle, and a shade for mounting to the bracket.

Preferably the bracket clips over the top edge of an opened window and is secured in position by winding the window up to trap the bracket between the top edge of the window and the window frame. Preferably the shade has a supporting stem which is engageable with the bracket and preferably the bracket includes a clamp for securing the supporting stem of the shade in position on the bracket. Preferably the clamp is adjustable to select the angle of the supporting stem.

Preferably the sunshade has a canopy that can be folded down against the support stem when not in use. Preferably guy lines are provided for optionally attaching to the edge of the shade.

An embodiment of this invention will now be described by way of example only and with reference to the accompanying drawings, in which:

FIG. 5 is a schematic view, of the sun shade, or canopy, of FIG. 1 mountable to a vehicle in a folded down position.

Figure 1:
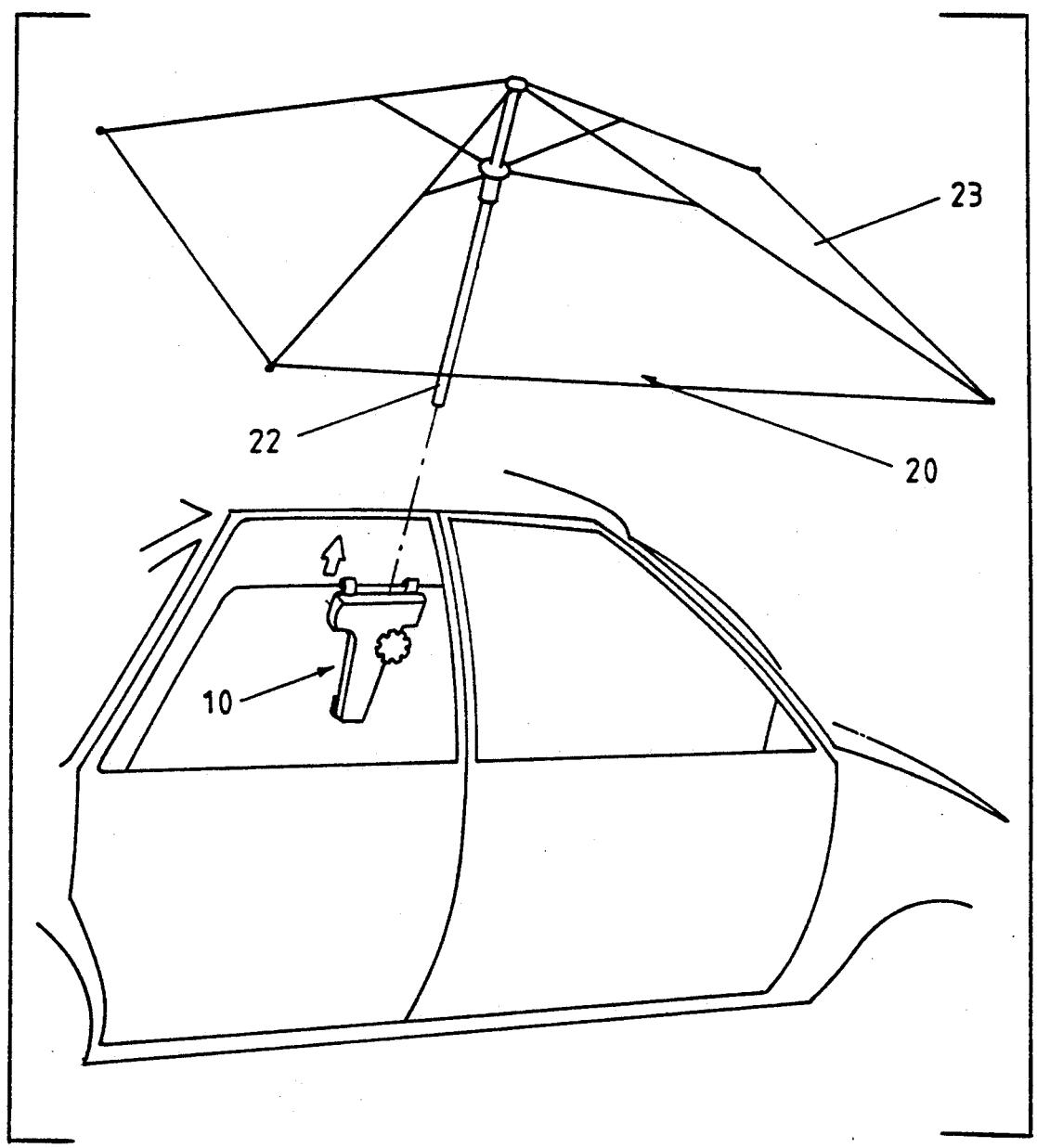
FIG. 1 is a schematic view of a sun shade mounted to a vehicle.

Referring to FIG. 1, there is shown a sun shade assembly for a car or other vehicle, comprising a bracket 10 for mounting over the top edge of a window of the vehicle and a sun shade 20 having a stem 22 for securing to the bracket. The sun shade 20 is in the form of an umbrella, and has a canopy 23 which can be folded down against the support stem 22 when not in use, as illustrated in FIG. 5, and extended as shown when required for use.

Figure 2:
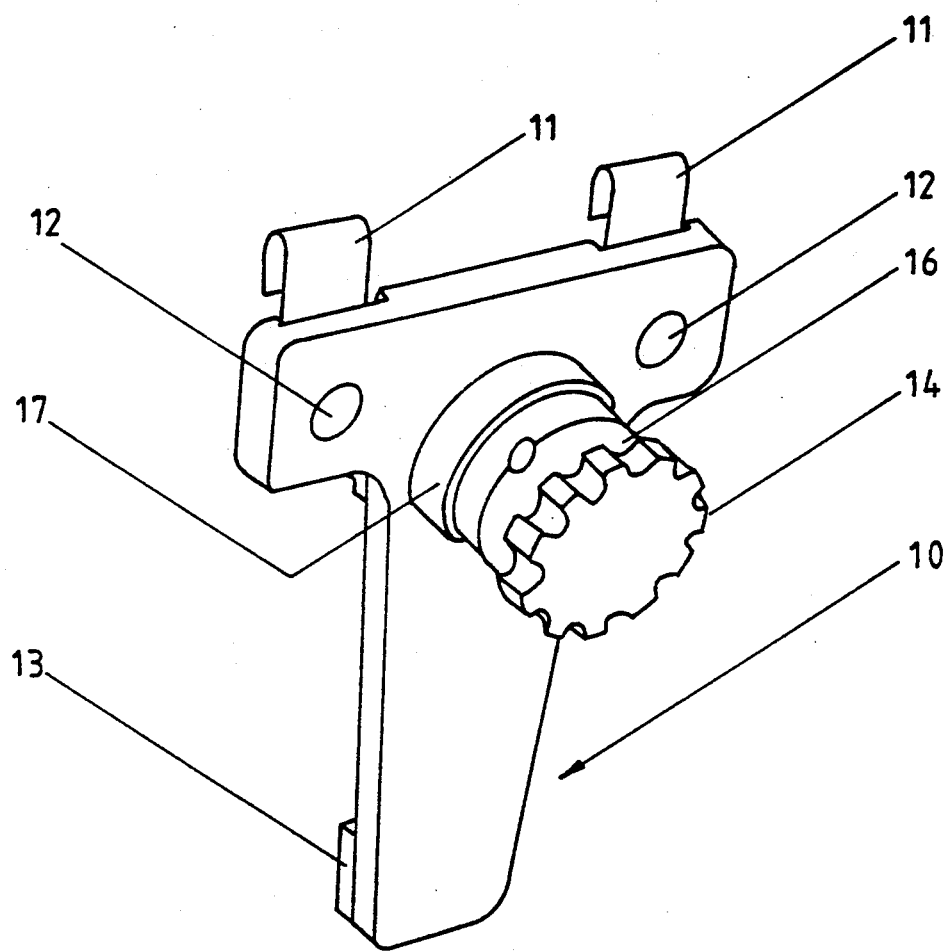
FIG. 2 is a view of the mounting bracket of the assembly.
Figure 3:
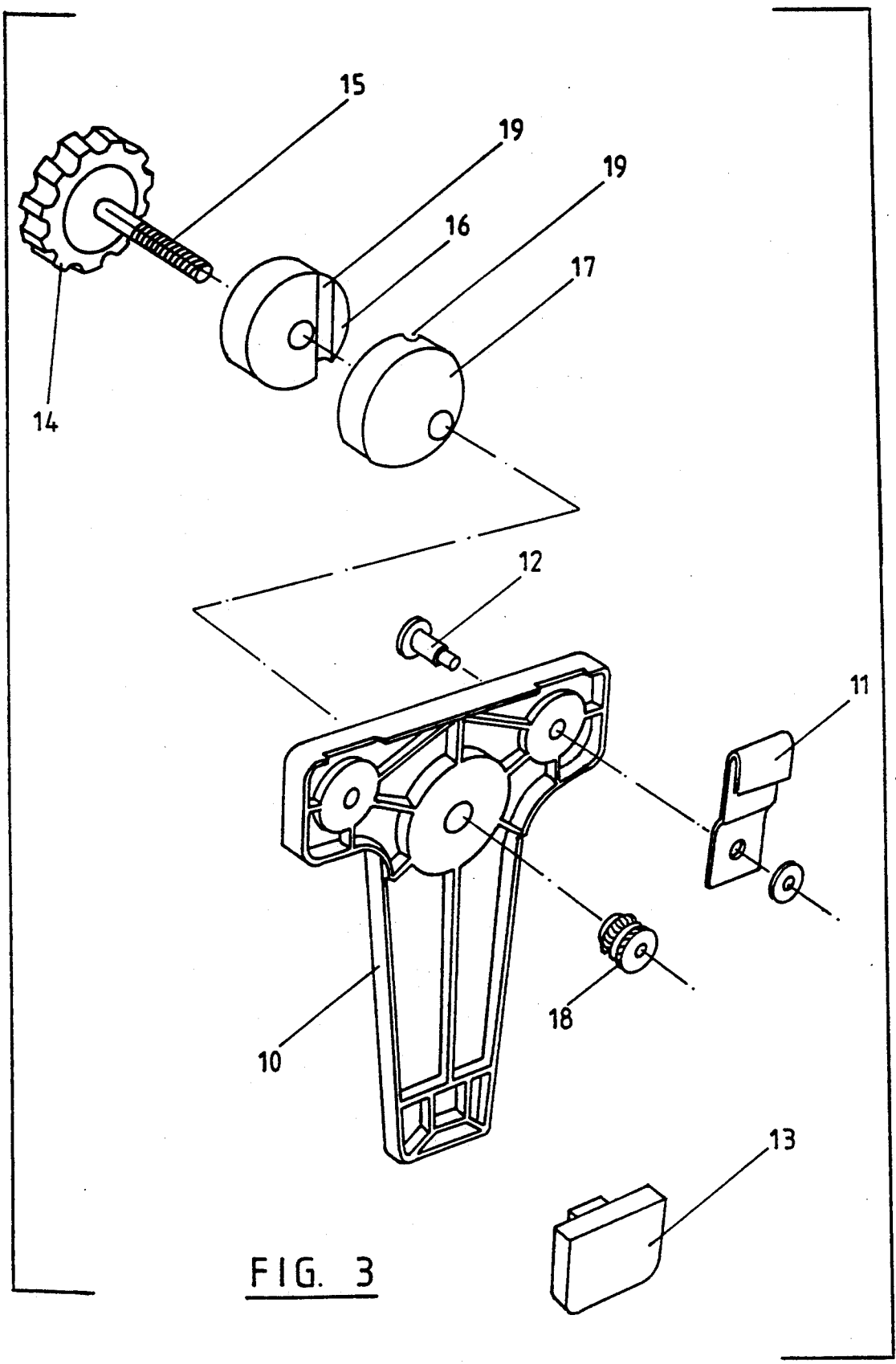
FIG. 3 is a view of the components of the bracket.

Referring to FIGS. 2 and 3, the bracket 10 comprises a generally T-shaped body, member having two metal, hooked clips 11 secured to its rear adjacent its top corners by means of rivets 12. The bracket also has a rubber pad 13 secured to its rear at its lower end. A knob 14 is fixed to a shaft 15 which passes through two clamp rings 16,17 and then through the body of the bracket, for its threaded end to receive a threaded insert 18 in the rear of the body. The two clamp rings are formed with cooperating grooves 19 to receive the stem 22 of the shade 20.

In use, the bracket is positioned with its clips 11 hooked over the top edge of the window of the car or other vehicle and with its rubber pad or foot 13 resting against the outer surface of the window. Then the window is raised to trap the clips 11 between the top edge of the window and the underside of the window frame at the top. The bracket, which has tolerance to fit glass or varying dimensions, is thus fixed in position. Next the stem 22 of the sun shade 20 is passed through the passage defined between the two clamp rings by their grooves 19, and the knob 14 is tightened to clamp the stem 22 between these rings and so mount the shade 20 securely in place. Variable height for the canopy 23 is achieved by lowering or rasing the stem 22 relative to the bracket 10. Further the bracket 10 can be adjusted to hold the stem 22 at variable angles. The stem 22 may also incorporate a pivot (not shown), so that the canopy 23 can be angled in any direction.

Figure 4:
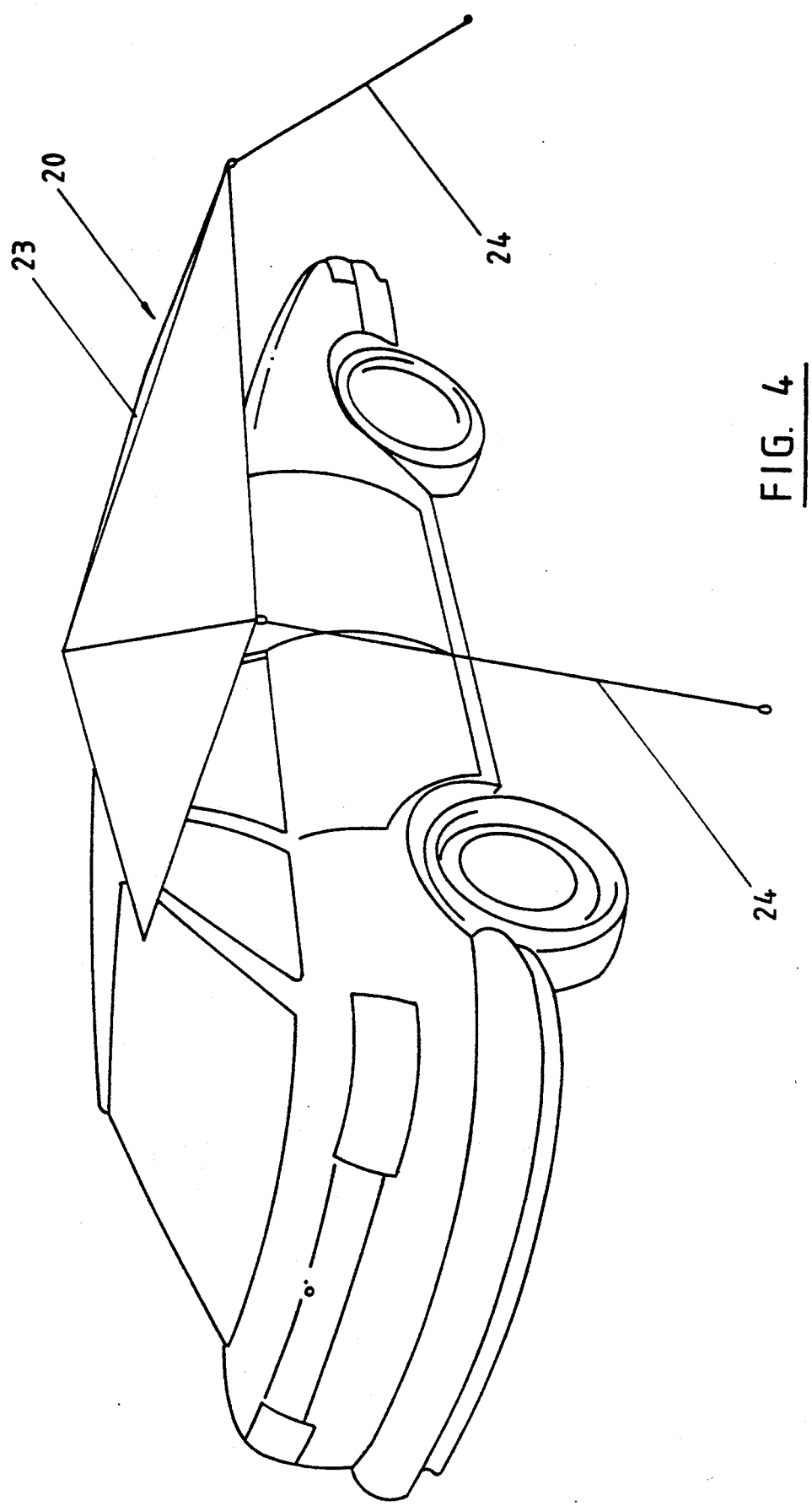
FIG. 4 is a schematic view of the sun shade mounted to a vehicle and provided with guy lines which may be used if desired for additional resistance against the wind.

As shown in FIG. 4, if desired guy lines 24 may be attached to the outer corners of the sun shade and pegged into the ground, in order to restrain the shade in windy conditions.

It will be appreciated that the shade projects outwardly from the side of the vehicle and so shades the windows and surrounding area from the sun.

I claim:

1. A vehicle sun shade, comprising:
   a mounting bracket for fitting to a top edge of a window of a vehicle, said mounting bracket including a substantially T-shaped body member having a transverse top portion and a leg portion projecting downward from the transverse top portion, the transverse top portion having hooked clips for hooking over the top edge of the vehicle and said leg portion having a lower end for resting against an outer surface of the window;
   a sun shade having a support stem and a canopy foldable downward against said support stem; and,
   clamp means projecting from said substantially T-shaped body member of said mounting bracket and clamping said support stem in a substantially upright position.

2. The vehicle sun shade as claimed in claim 1, wherein said clamp means include a shaft projecting from said substantially T-shaped body member and a pair of clamp members being carried by said shaft, said clamp members having cooperating grooves for receiving said support stem therebetween.

* * * * *